(12) United States Patent
Chang et al.

(10) Patent No.: US 8,547,487 B2
(45) Date of Patent: Oct. 1, 2013

(54) DISPLAY PANEL AND DISPLAY DEVICE USING THE SAME

(75) Inventors: Chiao-Han Chang, Miao-Li County (TW); Chung-Hsien Chang, Miao-Li County (TW)

(73) Assignee: Chimei Innolux Corporation (TW)

( * ) Notice: Subject to any disclaimer, the term of this patent is extended or adjusted under 35 U.S.C. 154(b) by 249 days.

(21) Appl. No.: 13/088,505

(22) Filed: Apr. 18, 2011

(65) Prior Publication Data
US 2012/0140129 A1 Jun. 7, 2012

(30) Foreign Application Priority Data
Dec. 3, 2010 (TW) .............................. 99142057 A

(51) Int. Cl.
*G02F 1/1335* (2006.01)

(52) U.S. Cl.
USPC .............................. 349/15; 349/110; 349/117

(58) Field of Classification Search
USPC .............. 349/15, 110, 117, 119, 96; 359/462
See application file for complete search history.

(56) References Cited

U.S. PATENT DOCUMENTS

| 7,075,604 B2* | 7/2006 | Yano et al. ..................... 349/117 |
| 7,808,564 B2* | 10/2010 | Tamura et al. .................. 349/15 |
| 2008/0055500 A1* | 3/2008 | Maeda ............................ 349/15 |
| 2010/0066814 A1* | 3/2010 | Su ................................... 348/47 |

* cited by examiner

*Primary Examiner* — Thoi Duong
(74) *Attorney, Agent, or Firm* — Lowe Hauptman & Ham, LLP

(57) ABSTRACT

The invention provides a display panel for displaying stereo images. The display panel includes a plurality of pixels arranged in a matrix formed by rows and columns, and a plurality of black strip patterns. A plurality of rows of pixels form a display group. Two adjacent display groups are used to display a first image and a second image, respectively. The black strip patterns are disposed to cover the regions between the two adjacent display groups.

12 Claims, 7 Drawing Sheets

DISPLAY PANEL AND DISPLAY DEVICE USING THE SAME

CROSS REFERENCE TO RELATED APPLICATIONS

This application claims priority of Taiwan Patent Application No. 99142057, filed on Dec. 3, 2010, the entirety of which is incorporated by reference herein.

BACKGROUND OF THE INVENTION

1. Field of the Invention

The present invention relates to a display panel displaying stereo images, and in particular relates to a display panel reducing areas of shade regions and raising brightness by changing the arrangement of images displayed on the display panel, and a display device using the same.

2. Description of the Related Art

Currently, stereo image displays are popular. In order to provide high quality to users, manufacturers have made efforts to develop and improve stereo image display technology. Glasses stereo image display technology is used as a main type of stereo image display technology. The glasses stereo image display technology comprises polarized glasses technology and shutter glasses technology. Generally, the concept of displaying a stereo image is that a left eye image and a right eye image, constituting a stereo image, are transmitted to the left eye and the right eye, of a viewer, respectively, such that a three-dimensional image can be constructed in the viewer's brain.

FIG. 1A is a front view showing a basic structure of a conventional display panel. FIG. 1B is a lateral view showing the conventional display panel of FIG. 1A, which is used to a polarized glasses type stereo image display panel.

As shown in FIG. 1A, a display panel 1 comprises: a plurality of pixels $P_{11} \sim P_{nm}$, arranged in a matrix formed by rows and columns, wherein m and n are integers greater than 1; a source driver 2, outputting data signals to all pixels $P_{11} \sim P_{nm}$ via source lines 6-1~6-m; and a gate driver 3, outputting scan signals via gate lines 7-1~7-n to control the periods when the data signals are input to the pixels $P_{11} \sim P_{nm}$. As shown in FIG. 1B, a display panel 1, from the back side to the front side, comprises a lower substrate 11a, a liquid crystal layer 11, an upper substrate 11b, a polarizer 12, a quarter wave plate 13, a retardation film 14, and black strip patterns 15. The lower substrate 11a comprises an inner surface 11a1 and an outer surface 11a2. The upper substrate 11b comprises an inner surface 11b1 and an outer surface 11b2. The liquid crystal layer 11 is sandwiched between the inner surface 11a1 of the lower substrate 11a and the inner surface 11b1 of the upper substrate 11b. On the inner surface 11b1 of the upper substrate 11b, there are a number of black matrixes BM disposed between adjacent rows of pixels. Note that for other display technologies, the black matrixes BM are able to be disposed on the inner surface 11a1 of the lower substrate 11a.

To make each eye of the viewer receive an exclusive image, the source driver 2 of the display panel 1 inputs left eye image data to odd row pixels and right eye image data to even row pixels, so that the odd row pixels can be used to display left images and the even row pixels can be used to display right images, as shown in FIG. 1B. After the light passes through the polarizer 12, there is a linear polarized light with a fixed polarization direction. The linear polarized light is converted to a circular polarized light (for example, a left circular polarized light in FIG. 1B) by the phase retardation effect of the quarter wave plate 13. The retardation film 14 comprises a plurality of portions arranged in rows, wherein the phase retardation of each odd row portions is $0\lambda$ and the phase retardation of each even row portions is $\frac{1}{2}\lambda$. When the display panel 1 is fabricated, the odd row portions of the retardation film 14 are aligned with the liquid crystal layer 11 belonging to the odd row pixels, and the even row portions of the retardation film 14 are aligned with the liquid crystal layer 11 belonging to the even row pixels. Therefore, in the case where the left circular polarized light passes through the odd row portions of the retardation film 14, the left circular polarized light will be the same with no phase retardation. In the case where the left circular polarized light passes through the even row portions of the retardation film 14, the left circular polarized light will be converted to a right circular polarized light for $\frac{1}{2}\lambda$ phase retardation.

A pair of polarized glasses 16 shown in FIG. 1B is used to make the left eye and the right eye of the viewer to receive exclusive images, respectively. A left glass 17 of the polarized glasses 16 is a left circular polarizer allowing the left circular polarized light to pass and making the right circular polarized light to be absorbed. A right glass 18 of the polarized glasses 16 is a right circular polarizer allowing the right circular polarized light to pass and making the left circular polarized light to be absorbed. Accordingly, the left eye image displayed by the odd row pixels can pass through only the left glass 17 and will be received by the viewer's left eye, and the right eye image displayed by the even row pixels can pass through only the right glass 17 and will be received by the viewer's right eye.

The black strip patterns 15 shown in FIG. 1B are disposed on the boundary regions between the odd row portions and the even row portions of the retardation film 14. The purpose of the black strip patterns 15 is to increase the vertical view angle for the viewer to see the stereo images correctly. Namely, within a predetermined view angle range, the black strip patterns 15 can block error images from being transmitted to the viewer. For example, when a viewer faces to the display panel 1 and moves upward and downward, the black strip patterns 15 block polarized light from passing through the boundaries between the odd row portions and the even row portions of the retardation film 14, to prevent the left eye of the viewer from receiving the right eye image or the right eye of the viewer from receiving the left eye image. That is to say, viewers are kept away from receiving the light passing through the liquid crystal layer 11 belonging to the odd row pixels and the even row portions of the retardation film 14, or the light passing through the liquid crystal layer 11 belonging to the even row pixels and the odd row portions of the retardation film 14, such that the view angle can increase.

Note that in the above structure of the polarized glasses type stereo image display panel, the quarter wave plate 13 can be removed. In this case, the phase retardation of the odd row portions of the retardation film 14 will be $\frac{1}{4}\lambda$, and the phase retardation of the even row portions of the retardation film 14 will be $-\frac{1}{4}\lambda$. Therefore, the effect of this structure is the same as that of the structure described previously. Note that the black strip patterns 15 can be disposed on any particular surface of the retardation film 14.

FIG. 2 is a diagram showing a conventional stereo image display method. In FIG. 2, the left eye image data $L_{source}$, from top to bottom, is divided into a plurality of left eye image row data L1, L2, L3 . . . ; and the right eye image data $R_{source}$, from top to bottom, is divided into a plurality of right eye image row data R1, R2, R3, . . . . When the left eye image data $L_{source}$ and the right eye image data $R_{source}$ are input to the conventional display panel, the left eye image row data and the right eye image row data, from top to bottom, are arranged in the order L1, R1, L2, R2, L3, R3, L4, R4, ..., as described previously. The black strip patterns 15 are disposed between the odd row pixels displaying the left eye image constituted by the left eye image row data L1, L2, L3, L4, ..., and the even row pixels displaying the right eye image constituted by the right eye image row data R1, R2, R3, R4, .... In FIG. 2, the symbol "w" represents the width of a black strip pattern. Generally, the width of the black strip pattern is made greater than the width of the black matrix BM so as to obtain a wider vertical view angle.

FIG. 3 is a vertical view angle-crosstalk curve diagram in the case where different widths of the black strip patterns are provided. The horizon axis represents the vertical view angle relative to the display panel. The vertical axis represents the degree of the crosstalk. Curve a represents a state wherein no black strip patterns exist. Curve b represents a state wherein the width of each black strip pattern is 30 μm. Curve c represents a state wherein the width of each black strip pattern is 60 μm. Curve d represents a state wherein the width of each black strip pattern is 90 μm. From FIG. 3, it is understood that under the same degree of crosstalk (for example, 7%), the vertical view angle of the display panel with black strip patterns is greater than the vertical view angle of the display panel having no black strip pattern, and the vertical view angle increases as the width of the black strip patterns increases.

However, even though the arrangement of the black strip patterns reduces of signal interference and increases the vertical view angle, transparent areas of the display panel will decrease, causing brightness of the display panel to decrease. Assuming that the width of a black strip pattern is a % of the width of a pixel, the brightness of the entire display panel would decrease to 1−a % because the number of the black strip patterns is equal to the number of the rows of the pixels. Therefore, the purpose of the invention is to provide a stereo image display panel or a stereo image display device capable of improving the drawback of low brightness.

BRIEF SUMMARY OF THE INVENTION

The present invention provides a display panel with rearranged black strip patterns and operated with a changed display method. Therefore, the problem where the brightness of the conventional display panel substantially decreases is improved.

The present invention provides a display panel for displaying a stereo image, including a plurality of pixels arranged in a matrix formed by rows and columns, wherein a plurality of rows of pixels form a display group, and two adjacent display groups are used to display a first image and a second image, respectively, and a plurality of black strip patterns are disposed at the boundaries between the two adjacent display groups.

The display panel of the invention is a liquid crystal display panel. The display panel further includes an upper substrate comprising an inner surface and an outer surface opposite to the inner surface, a lower substrate comprising an inner surface and an outer surface opposite to the inner surface, a liquid crystal layer sandwiched between the inner surface of the upper substrate and the inner surface of the lower substrate, a polarizer disposed on the outer surface of the upper substrate, and a retardation film disposed on the polarizer, wherein the retardation film has two different phase retardation values corresponding to the two adjacent display groups.

In the display panel of the invention, the black strip patterns are disposed on the retardation film.

In the display panel of the invention, the black strip patterns are disposed on the inner surface of the upper substrate.

The display panel of the invention further includes a plurality of black matrixes disposed on the inner surface of the upper substrate, wherein at least one black matrix is disposed at the boundary of the rows of pixels which is between the adjacent black strip patterns.

In the display panel of the invention, the width of the black matrix is less than the width of the black strip pattern.

The display panel of the invention further includes a quarter wave plate sandwiched between the polarizer and the retardation film, wherein the two different phase retardation values are $0\lambda$ and $\frac{1}{2}\lambda$, or $\frac{1}{4}\lambda$ and $-\frac{1}{4}\lambda$.

In the display panel of the invention, along a direction which is orthogonal to the outer surface of the upper substrate, some black matrixes are disposed at the boundaries of the rows of pixels which are between the adjacent black strip patterns, and the others are disposed at the boundaries of the rows of pixels corresponding to the positions of the black strip patterns.

In the display panel of the invention, the areas of the two adjacent display groups covered by the black strip patterns are the same.

In the display panel of the invention, the areas of the two adjacent display groups covered by the black strip patterns are different.

In the display panel of the invention, a time difference between capturing the first image and the second image is less than or equal to $\frac{1}{60}$ second.

In the display panel of the invention, capture angles of the first image and the second image are different.

The present invention further provides a display device using the above display panel for displaying stereo images A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Elements equal to the elements described in the related art are given the same symbol and the related description is not repeated.

Figure 4:
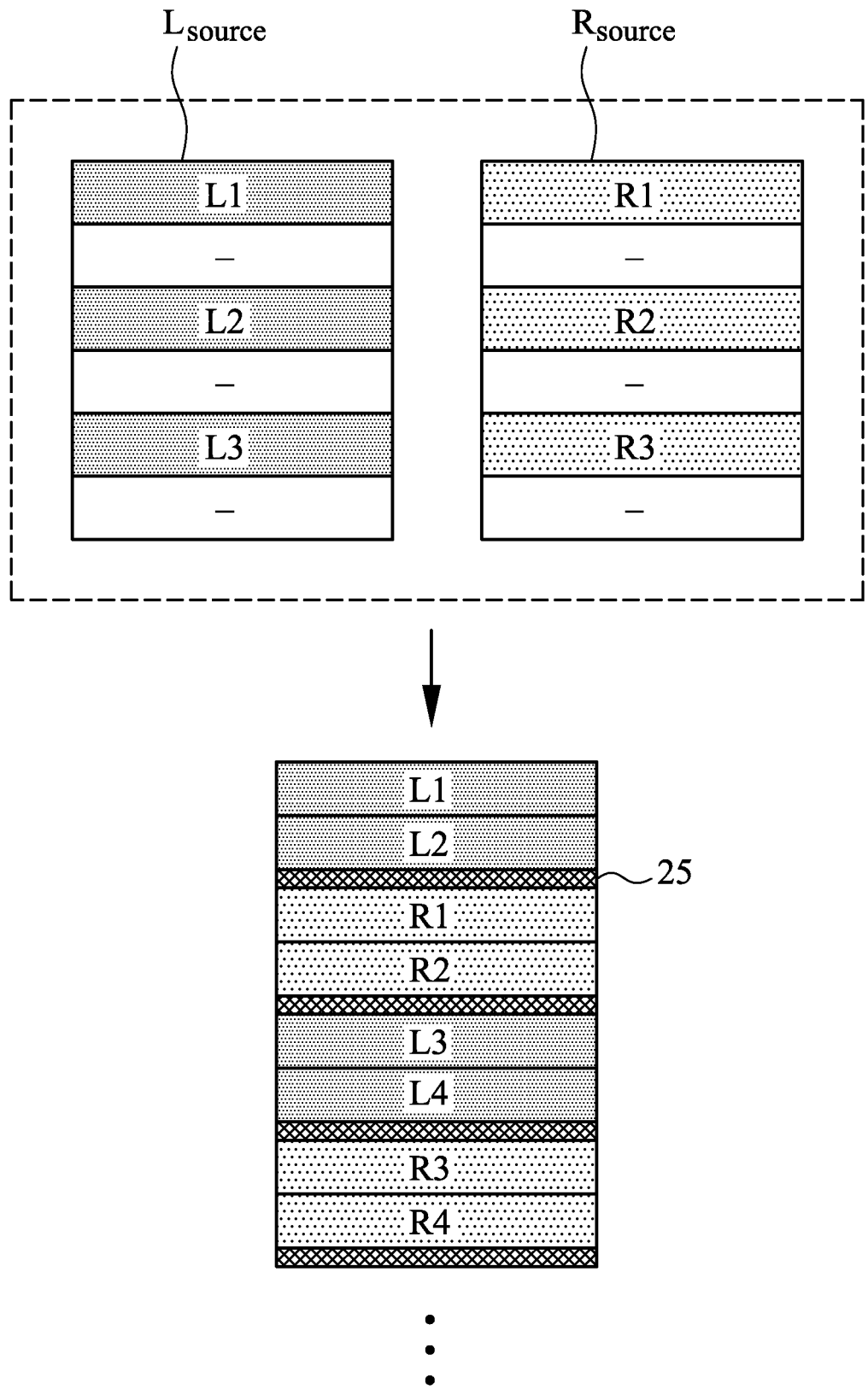
FIG. 4 is a diagram showing a stereo image display method of a display panel according to the first embodiment.
Figure 5:
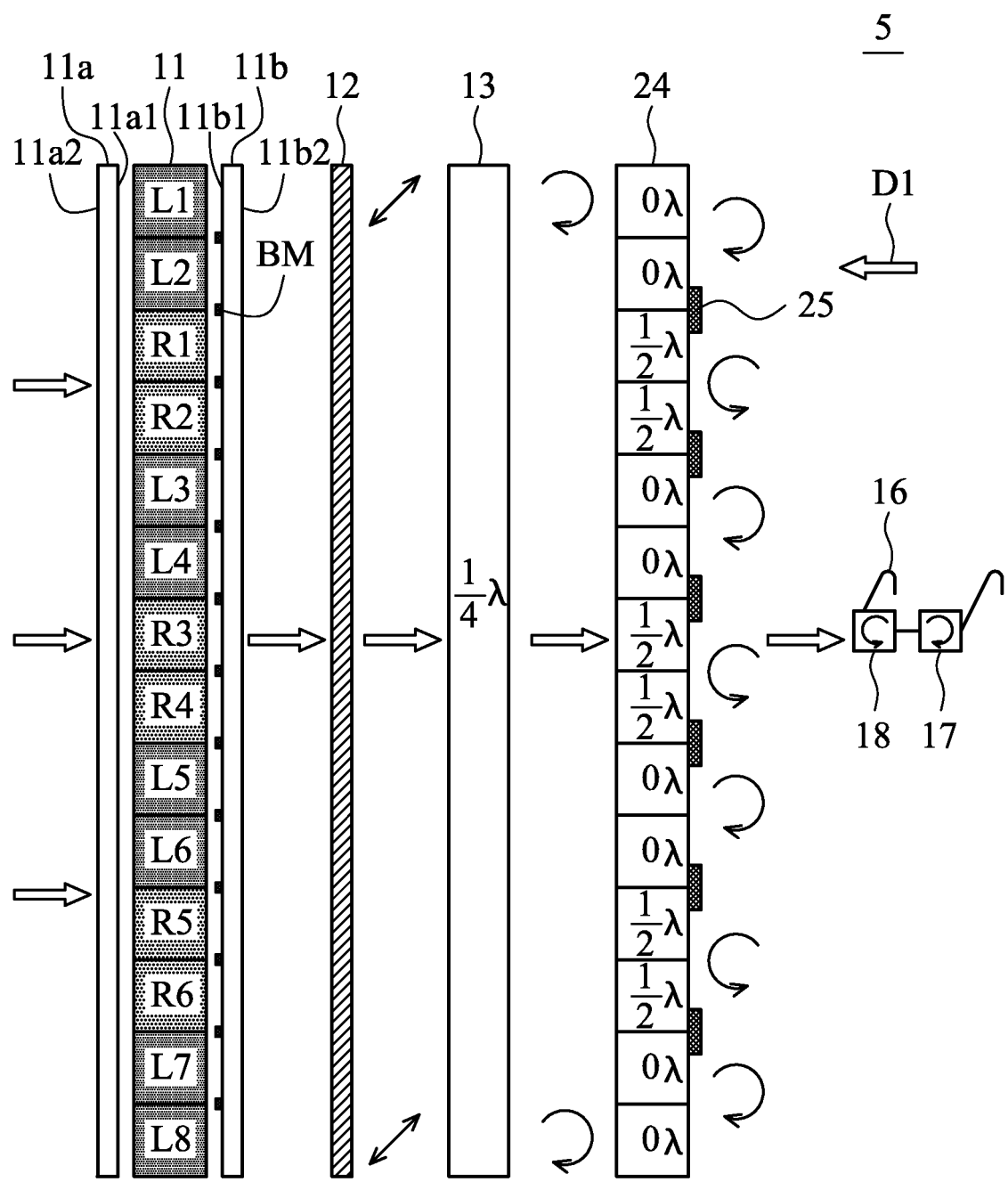
FIG. 5 is a lateral view showing the display panel according to the first embodiment, which is used to a polarized glasses stereo image display panel.

FIG. 4 is a diagram showing a stereo image display method of a display panel according to the first embodiment of the invention. FIG. 5 is a lateral view showing the display panel according to the first embodiment of the invention, which is used to a polarized glasses stereo image display panel.

As shown in FIG. 4, the left eye image data $L_{source}$, from top to bottom, are divided into a plurality of left eye image row data L1, L2, L3 . . . , and the right eye image data $R_{source}$, from top to bottom, are divided into a plurality of right eye image row data R1, R2, R3, . . . . When the left eye image data $L_{source}$ and the right eye image data $R_{source}$ are input to the display panel of the invention, the left eye image row data and the right eye image row data, from top to bottom, are arranged in order L1, L2, R1, R2, L3, L4, R3, R4, . . . . The difference between the conventional display method and the display method of the invention is that the interlaced period of the left eye image and the right eye image is increased. The left eye image and the right eye image are interchanged for every two rows of pixels. Note that the interlaced period of the left eye image and the right eye image is not limited thereto.

Figure 1A:
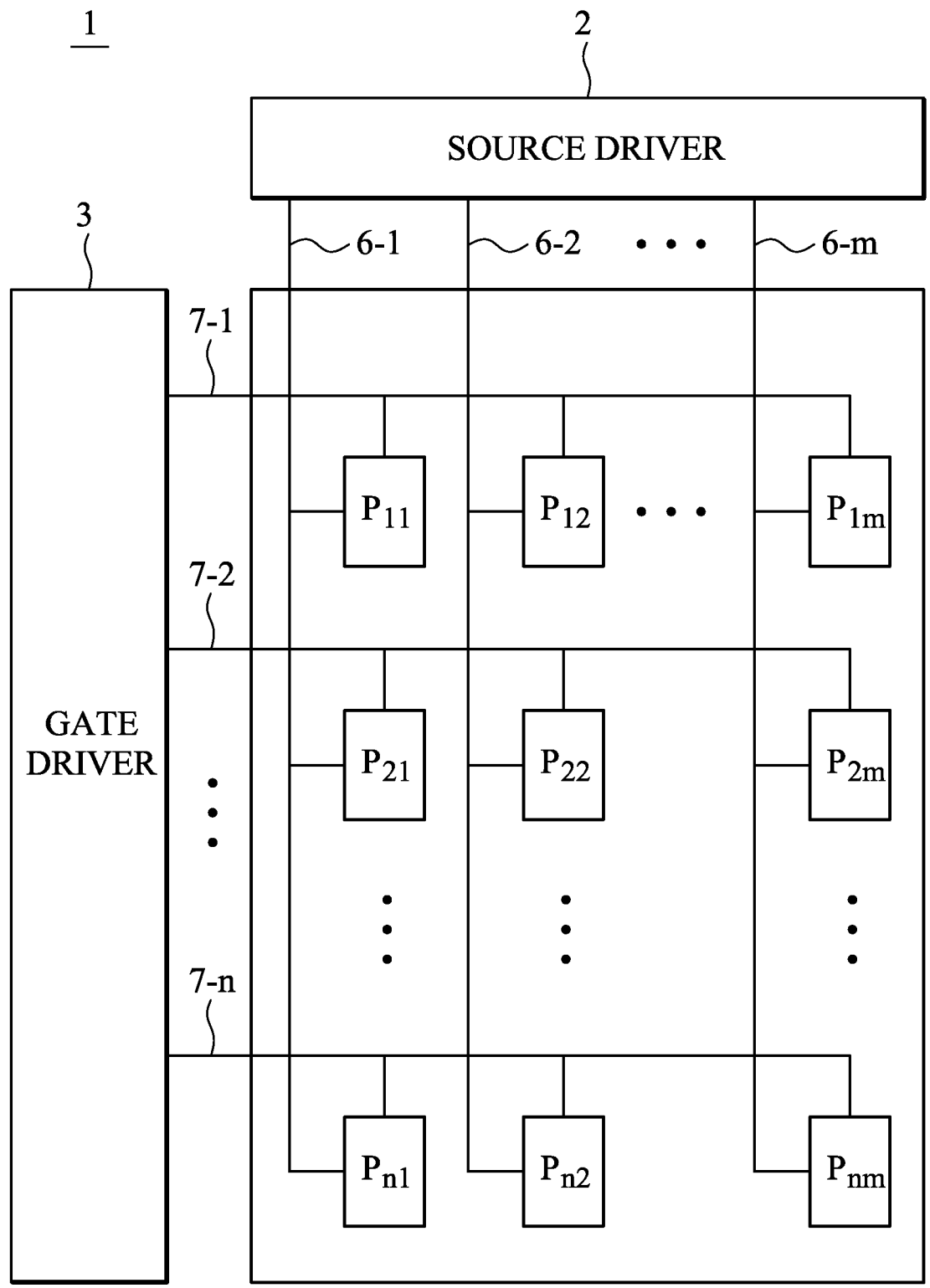
FIG. 1A is a front view showing a basic structure of a conventional display panel.
Figure 1B:
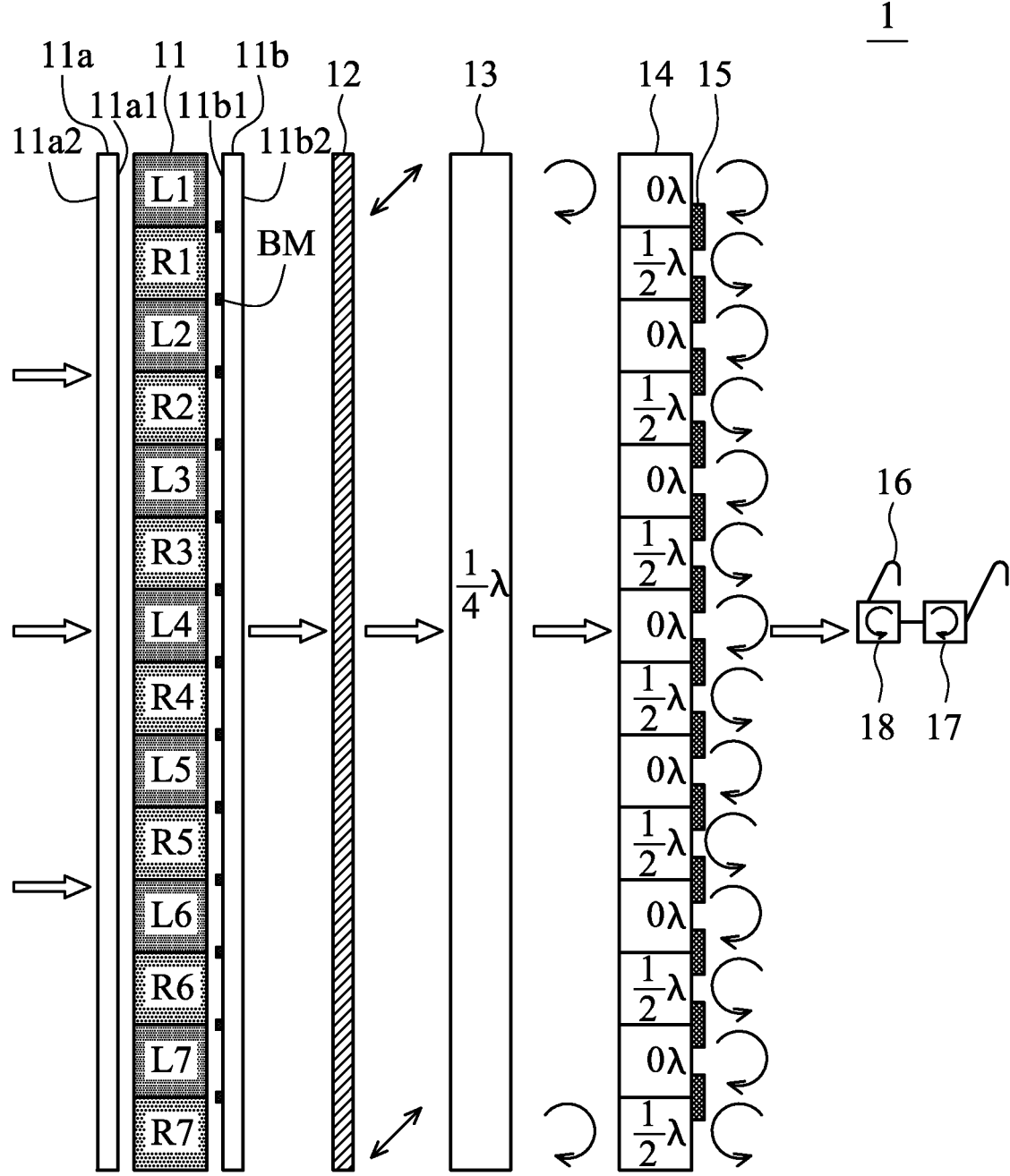
FIG. 1B is a lateral view showing the conventional display panel of FIG. 1A, which is used to a polarized glasses stereo image display panel.
Figure 2:
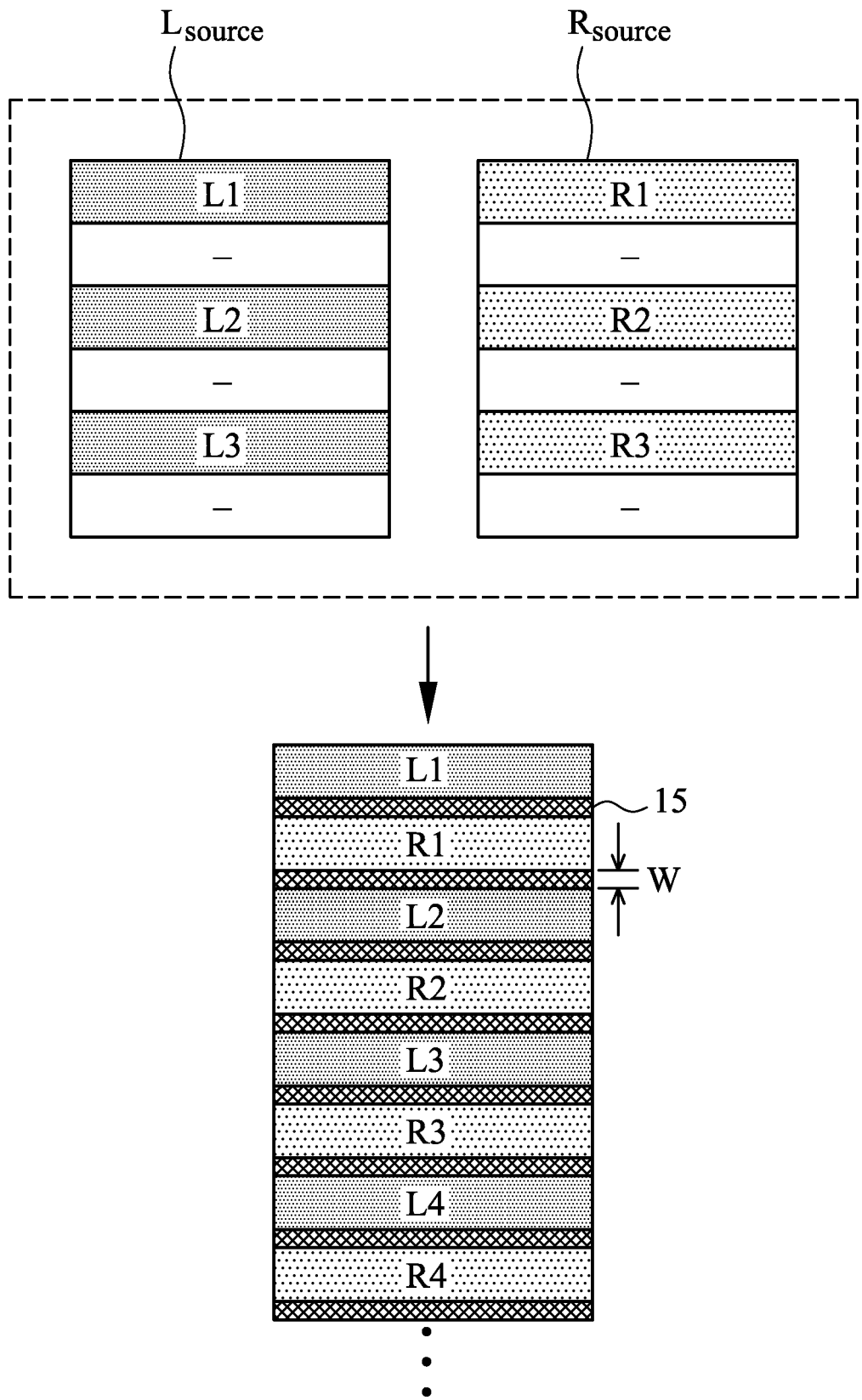
FIG. 2 is a diagram showing a conventional stereo image display method.
Figure 3:
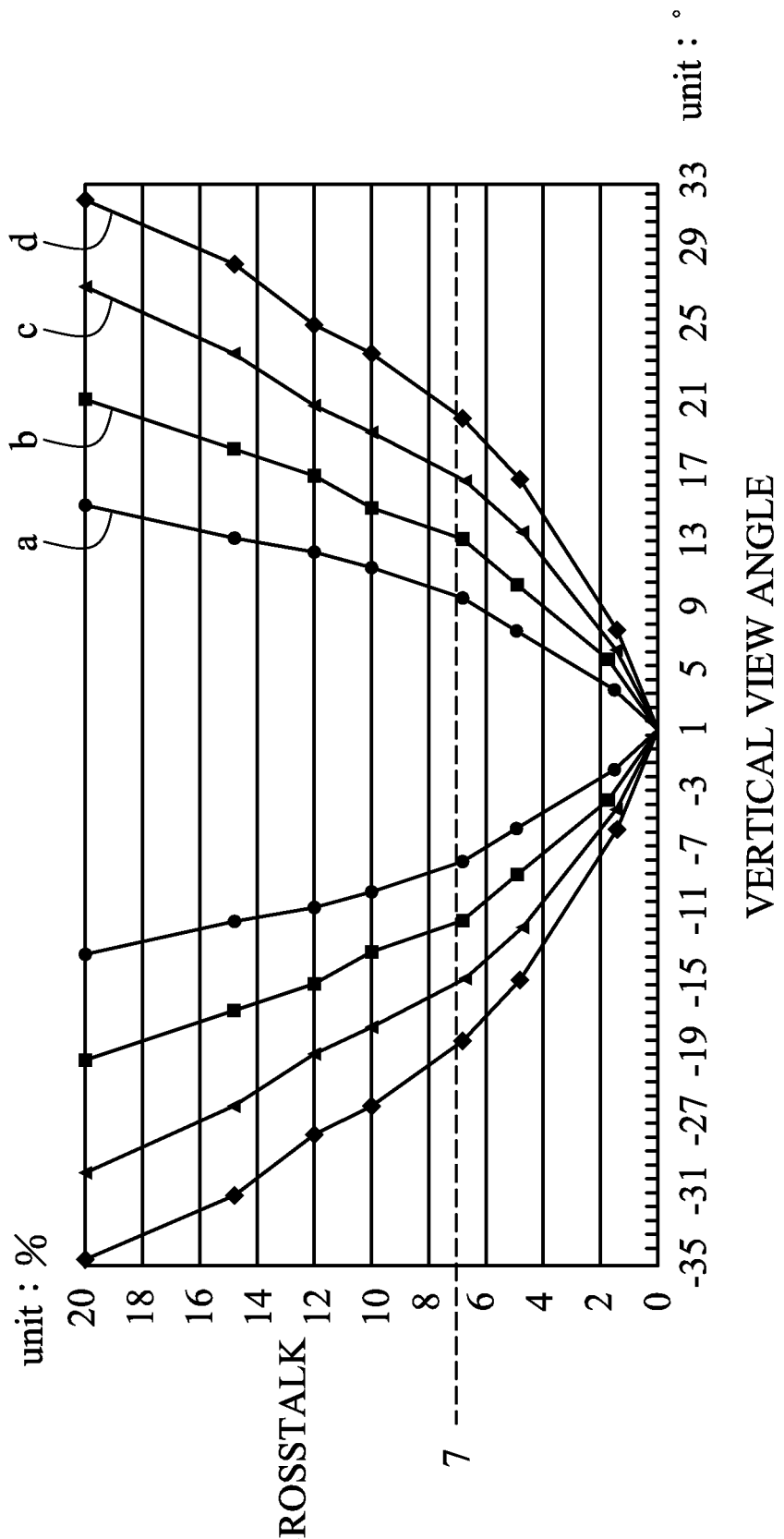
FIG. 3 is a vertical view angle-crosstalk curve diagram in the case where different widths of the black strip patterns are provided.

Concerning structure, as shown in FIG. 5, besides the retardation film 24 and the black strip pattern 25, elements in the display panel 5 of the invention are the same as the elements shown in FIG. 1B.

To interchange the left eye image and the right eye image for every two rows of pixels, in addition to changing the sequence of the left eye image data $L_{source}$ and the right image eye data $R_{source}$ input to the display panel 5, the retardation film 24 should also change correspondingly. In FIG. 5, the interlaced period of 0λ phase retardation and ½λ phase retardation of the retardation film 24 should change to two rows of pixels to match the interlaced period of the left eye image and the right eye image displayed on the display panel 5. Accordingly, the black strip patterns 25 are disposed on the boundaries between the rows of pixels displaying the left eye image and the rows of pixels displaying the right eye image, as shown in FIGS. 4 and 5.

Here, the rows of pixels input to the left eye image row data L1, L2 can be considered a display group and the rows of pixels input to the left eye image row data L3, L4 can be considered another display group. Also, the rows of pixels input to the right eye image row data R1, R2 can be considered a display group and the rows of pixels input to the right eye image row data R3, R4 can be considered another display group. The black strip patterns 25 are disposed on the regions between the two adjacent display groups.

Accordingly, the number of the black strip patterns 25 applied to the display panel 5 of the invention is half that of the number of the black strip patterns 15 applied to the conventional display panel 1, such that the transparent areas are increased. Similarly, assuming that the width of a black strip pattern is a % of the width of a row of pixels, the brightness of the entire display panel only decreases to 1-0.5×a %, because the number of the black strip patterns is half as many as the number of the rows of pixels.

As shown in FIG. 5, the black matrixes BM are disposed on the inner surface 11b1 of the upper substrate 11b. Meanwhile, along a direction D1 which is orthogonal to the outer surface 11b2 of the upper substrate 11b, some black matrixes BM are disposed at the boundaries of the rows of pixels which are between the adjacent black strip patterns 25 and the others are disposed at the boundaries of the rows of pixels corresponding to the positions of the black strip patterns 25. Note that in other display technology, the black matrixes BM are able to be disposed on the inner surface 11a1 of the lower substrate 11a.

Figure 6:
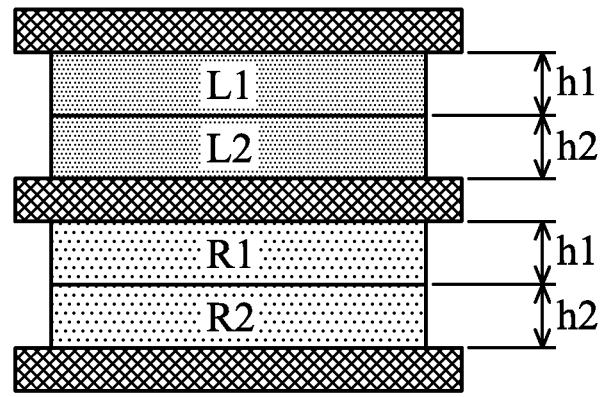
FIG. 6 is a diagram showing that the black strip patterns of the first embodiment are disposed between the rows of pixels unsymmetrically.

FIG. 6 is a diagram showing that the black strip patterns of the first embodiment are disposed between the rows of pixels unsymmetrically. In manufacturing, layers of display panels (for example, the liquid crystal layer and the retardation film) may not be aligned precisely because of limited precision. As shown in FIG. 6, the black strip patterns are not symmetrically disposed between the rows of pixels displaying the left eye image and the rows of pixels displaying the right eye image, and have a downside tendency. Namely, a black strip pattern covers different areas of the two rows of pixels. Therefore, in FIG. 6, the width h1 of the transparent region of the row of pixels input the left eye image row data L1 is narrower than the width h2 of the transparent region of the row of pixels input the left eye image row data L2, and the width h1 of the transparent region of the row of pixels input the right eye image row data R1 is narrower than the width h2 of the transparent region of the row of pixels input the right eye image row data R2. However, the width h1+h2 of the transparent region of the rows of pixels displaying the left eye image is equal to the width h1+h2 of the transparent region of the rows of pixels displaying the right eye image, so the entire transparent regions are not influenced by unsymmetry.

Figure 7:
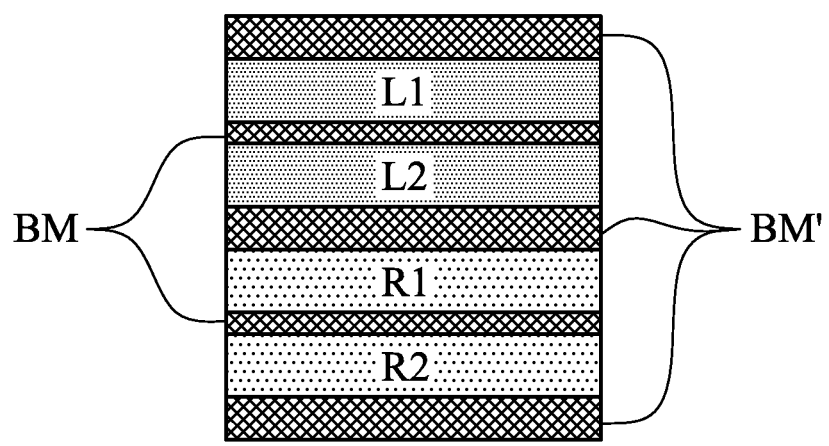
FIG. 7 is a diagram showing a stereo image display method of a display panel according to the second embodiment.

FIG. 7 is a diagram showing a stereo image display method of a display panel according to the second embodiment of the invention. In the first embodiment, the black strip patterns 25, shown in FIG. 5, are disposed on the retardation film 24, but there are no black strip patterns disposed on the retardation film in the second embodiment. The function of the black strip patterns disposed on the retardation film is reached by increasing the width of some black matrixes disposed on the inner surface of the upper substrate. Specifically, in the display panel of the second embodiment, the width of the black matrixes disposed between the rows of pixels displaying the left eye image and the rows of pixels displaying the right eye image are increased to achieve the function of the black strip patterns. As shown in FIG. 7, the width of the black matrixes BM disposed between the rows of pixels displaying the left eye image (or the right eye image) and the rows of pixels also displaying the left eye image (or the right eye image) is unchanged, and the width of the black matrixes BM' disposed between the rows of pixels displaying the left eye image and the rows of pixels displaying the right eye image is wider than the width of the black matrixes BM. The black matrixes BM' can be considered as the black strip patterns.

According to the first embodiment and the second embodiment, the black strip patterns are disposed on the retardation film or the inner surface of the upper substrate. Meanwhile, along a direction which is orthogonal to the outer surface of the upper substrate, in the case where the black strip patterns are disposed on the retardation film, black matrixes are disposed at the boundaries of the rows of pixels which are between adjacent black strip patterns and at the positions corresponding to the black strip patterns. In the case where the black strip patterns are disposed on the inner surface of the upper substrate, black matrixes are disposed at the boundaries of rows of pixels which are between adjacent black strip patterns.

According to the first embodiment and the second embodiment, the present invention can reduce areas of shade regions to raise brightness of the display panel effectively by changing the arrangement of images displayed on the display panel and rearranging the black strip patterns.

Now the way how to produce stereo image data to be input to the display panel or the display device of the invention is briefly described below. Producing stereo image data needs simultaneous capturing of image data of an object to be filmed by two video cameras from different angles. In actual filming, it is hard to be perfectly synchronous the timing for capturing an object by two video cameras, but at least the time difference between the timings for capturing an object by the two video cameras must be less than or equal to 1/60 second. Otherwise, when the stereo image is played, a user will not be able to obtain the correct stereo image because the time difference between the left eye image and the right eye image is too long.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel for displaying a stereo image, comprising:
    a plurality of pixels arranged in a matrix formed by rows and columns, wherein a plurality of rows of pixels form a display group, and two adjacent display groups are used to display a first image and a second image, respectively; and
    a plurality of black strip patterns disposed at the boundaries between the two adjacent display groups,
    wherein the display panel is a liquid crystal display panel and comprises:
        an upper substrate comprising an inner surface and an outer surface opposite to the inner surface;
        a lower substrate comprising an inner surface and an outer surface opposite to the inner surface;
        a liquid crystal layer sandwiched between the inner surface of the upper substrate and the inner surface of the lower substrate;
        a polarizer disposed on the outer surface of the upper substrate; and
        a retardation film disposed on the polarizer, wherein the retardation film has two different phase retardation values corresponding to the two adjacent display groups,
    wherein at least one black matrix is disposed at the boundary of the rows of pixels which is between the adjacent black strip patterns.

2. The display panel as claimed in claim 1, wherein the black strip patterns and the at least one black matrix are disposed on the inner surface of the upper substrate.

3. The display panel as claimed in claim 2, wherein the width of the black matrix is less than the width of the black strip pattern.

4. The display panel as claimed in claim 1, further comprising:
    a quarter wave plate sandwiched between the polarizer and the retardation film,
        wherein the two different phase retardation values are $0\lambda$ and $\frac{1}{2}\lambda$, respectively.

5. The display panel as claimed in claim 1, further comprising:
    a quarter wave plate sandwiched between the polarizer and the retardation film,
        wherein the two different phase retardation values are $\frac{1}{4}\lambda$ and $-\frac{1}{4}\lambda$, respectively.

6. The display panel as claimed in claim 1, wherein the black strip patterns are disposed on the retardation film and the at least one black matrix is disposed on the inner surface of the upper substrate,
    wherein when viewed along a direction which is orthogonal to the outer surface of the upper substrate, some black matrixes are disposed at the boundaries of the rows of pixels which are between the adjacent black strip patterns, and the others are disposed at the boundaries of the rows of pixels corresponding to the positions of the black strip patterns.

7. The display panel as claimed in claim 6, wherein the width of the black matrix is less than the width of the black strip pattern.

8. The display panel as claimed in claim 1, wherein the areas of the two adjacent display groups covered by the black strip patterns are the same.

9. The display panel as claimed in claim 1, wherein the areas of the two adjacent display groups covered by the black strip patterns are different.

10. The display panel as claimed in claim 1, wherein a time difference between capturing the first image and the second image is less than or equal to 1/60 second.

11. The display panel as claimed in claim 1, wherein capture angles of the first image and the second image are different.

12. A display device comprising the display panel as claimed in claim 1.

* * * * *